Nov. 14, 1950  J. L. MOODY  2,529,810
POWER UNIT
Filed July 30, 1945  4 Sheets-Sheet 1
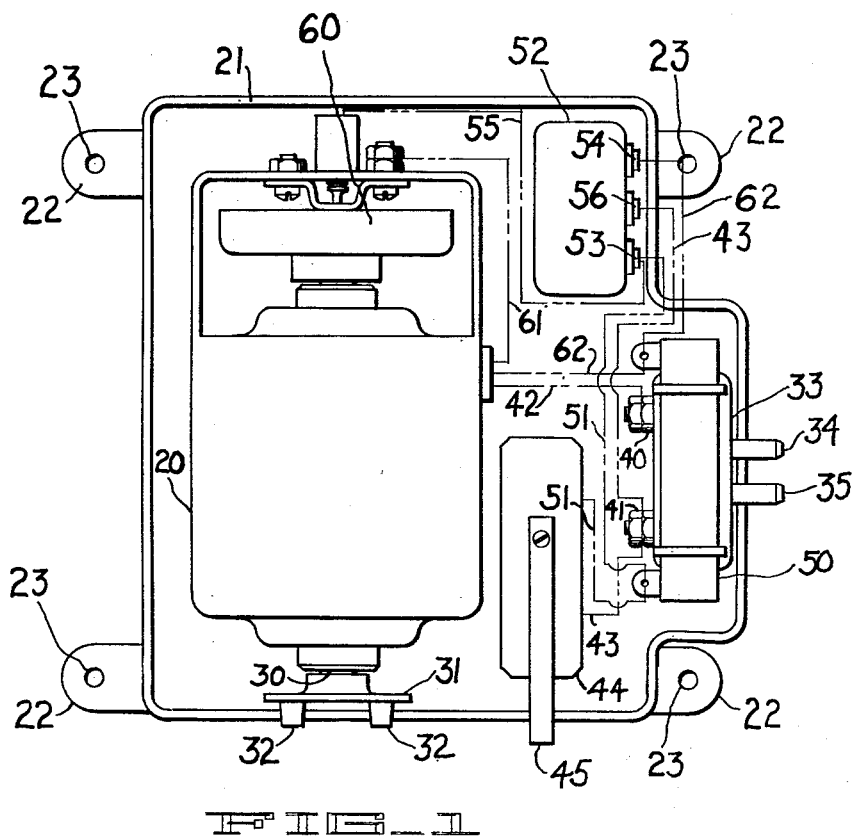
FIG. 1
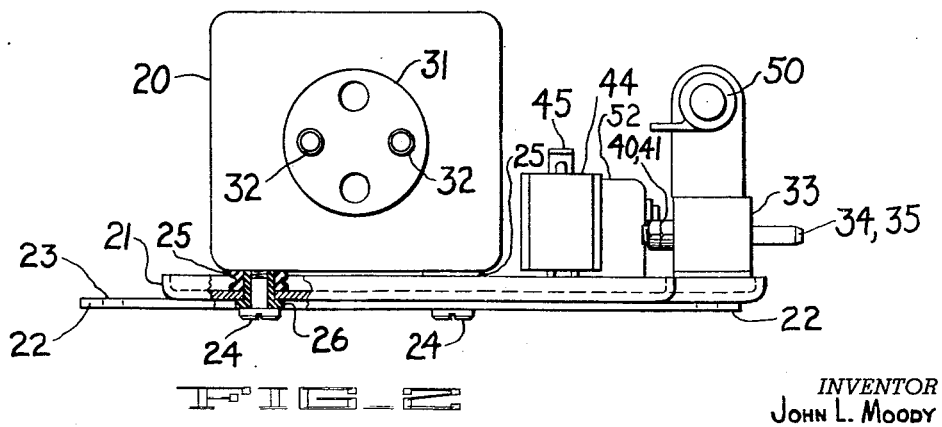
FIG. 2
INVENTOR
John L. Moody
BY 
ATTORNEY Nov. 14, 1950  J. L. MOODY  2,529,810
POWER UNIT
Filed July 30, 1945  4 Sheets—Sheet 2
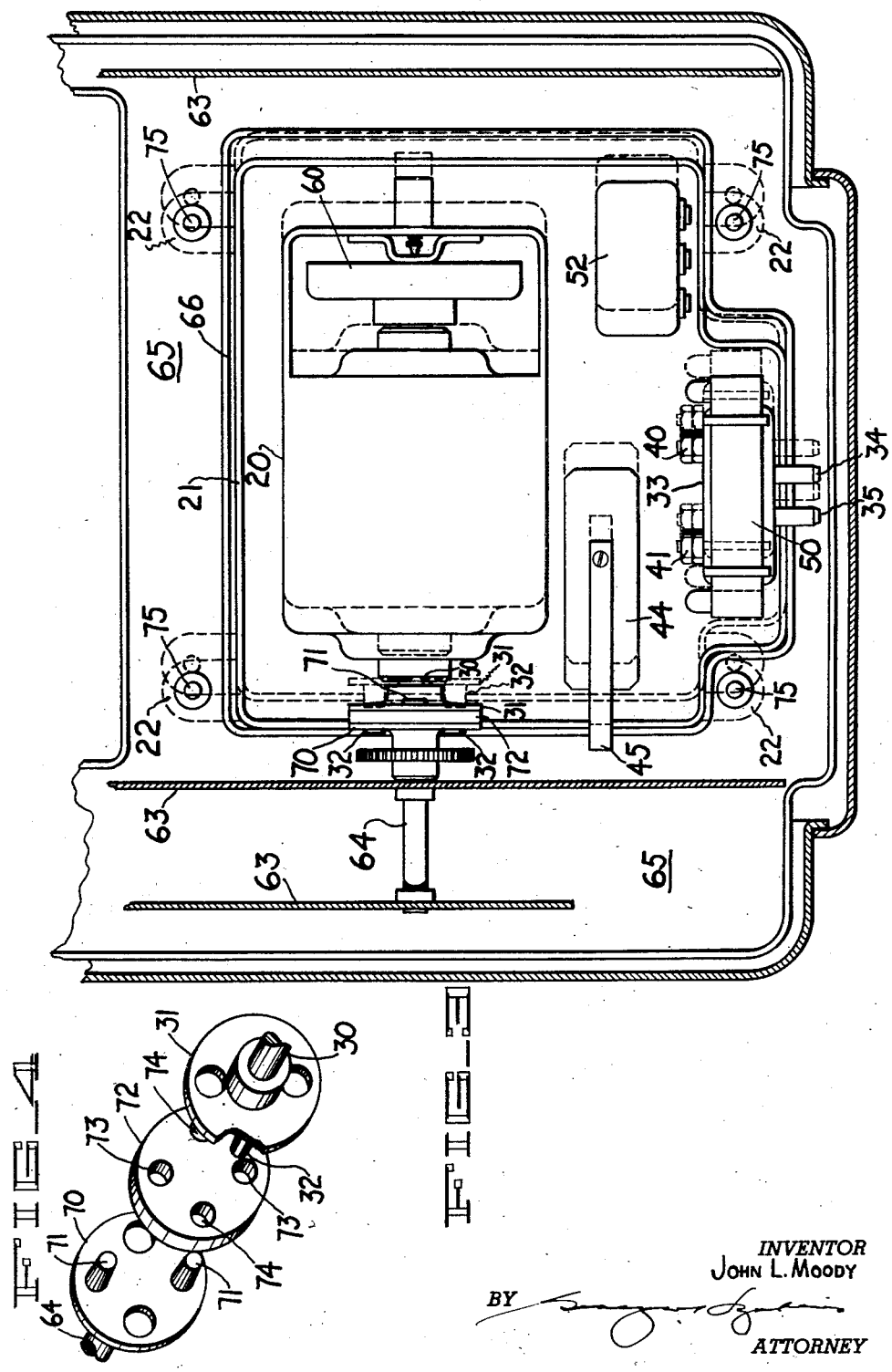
INVENTOR
JOHN L. MOODY
BY
ATTORNEY Nov. 14, 1950     J. L. MOODY     2,529,810
POWER UNIT
Filed July 30, 1945     4 Sheets-Sheet 3
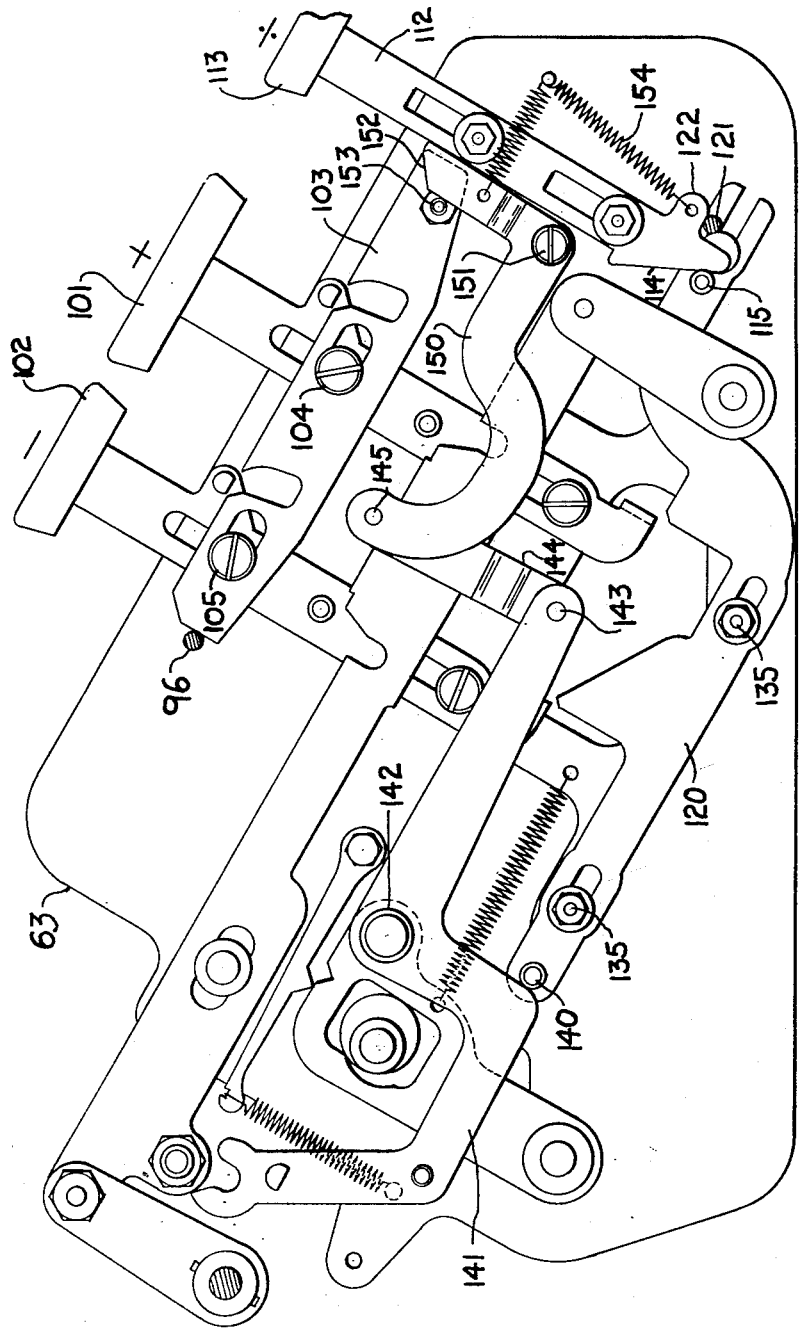
INVENTOR
JOHN L. MOODY
BY
ATTORNEY Nov. 14, 1950   J. L. MOODY   2,529,810
POWER UNIT
Filed July 30, 1945   4 Sheets-Sheet 4
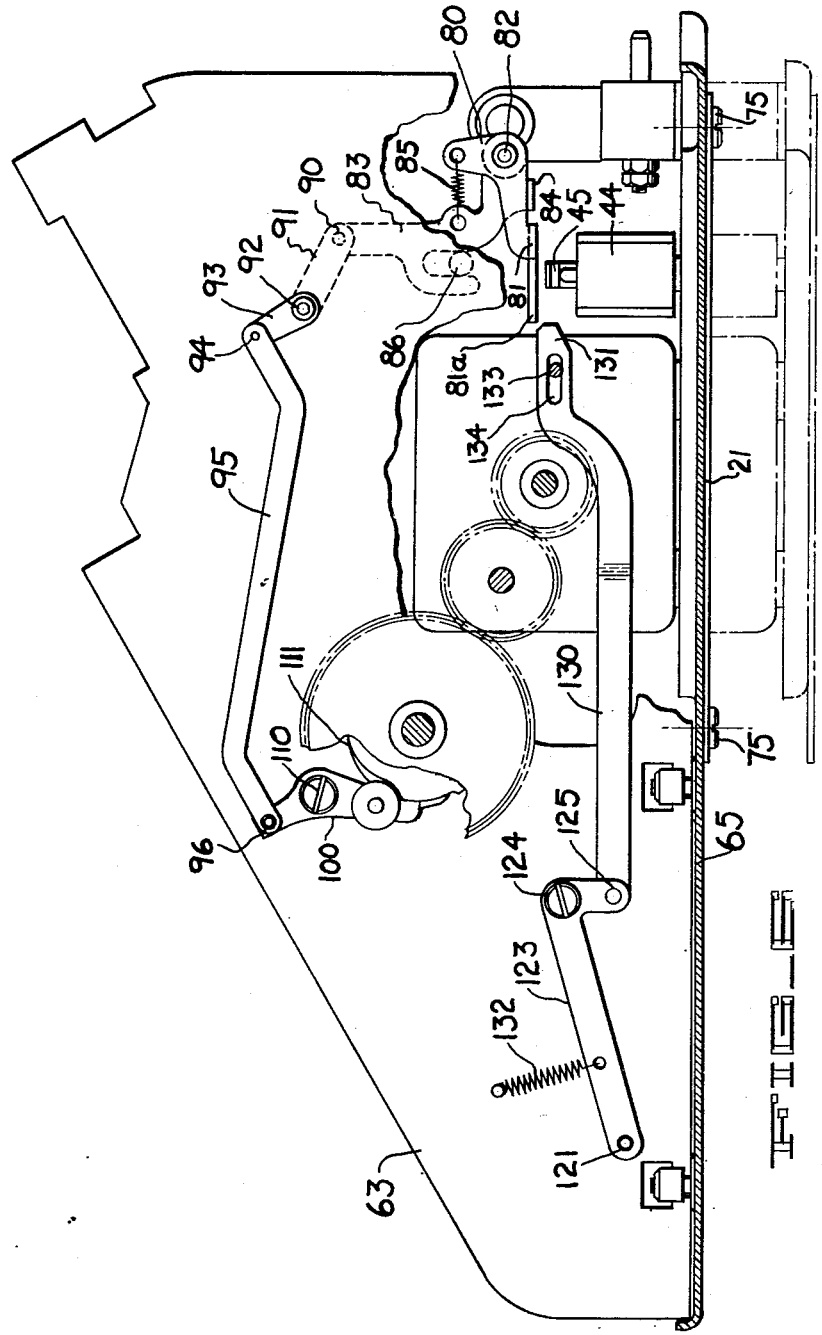
INVENTOR
John L. Moody
BY 
ATTORNEY Patented Nov. 14, 1950

2,529,810

UNITED STATES PATENT OFFICE 2,529,810

POWER UNIT

John L. Moody, Oakland, Calif., assignor to Friden Calculating Machine Co., Inc., a corporation of California Application July 30, 1945, Serial No. 607,825

11 Claims. (Cl. 235—62)

This invention relates to motors. More specifically, this invention relates to self-contained electrical power units and means operable for the control of same.

An object of this invention is to provide an electrical power unit comprising an electric motor, a switch, a resistor, a terminal block, condensers and the necessary electrical wiring to connect these elements, thereby making said unit self-contained and sufficiently compact to be readily installed in a machine in operative driving relation therewith, or readily removed therefrom for servicing.

The following specification describes the invention as being embodied in a calculating machine similar to that disclosed in the patents to Friden Nos. 2,229,889 and 2,366,345, but this in no manner is to be construed as limiting the scope of the instant invention to the described embodiment.

In the drawings:

Figure 1 is a plan view of the self-contained electrical power unit.

Figure 2 is an elevation of the same.

Figure 3 is a plan view showing how the unit is installed in a machine.

Figure 4 is an exploded view of a coupling.

Figure 5 is an elevational section showing a part of the control mechanism of a calculating machine.

Figure 6 is an elevational section of a calculating machine showing how the unit is installed in the machine and also the means for controlling the operation of said self-contained power unit.

The electrical power unit is a self-contained driving unit wherein, unlike known electrical power drives, all elements thereof (motor, terminal block, condensers, resistor, switch, and the necessary wiring to complete a circuit) are mounted on a single, small plate that may be readily installed in a machine in operative driving relation therewith, or removed therefrom for servicing. In known calculating machines should the motor switch become damaged, it would be necessary to disassemble the machine to a marked extent in order to repair or withdraw the switch and to install a new one in its place. In the unit of the invention, however, should any portion of the electrical circuit need repair or replacement, it would be necessary only to unscrew four mounting screws, as will be apparent from the following description, and withdraw the complete electrical unit from the machine for said repair or replacement.

Referring to Figures 1 and 2, 20 indicates an electric motor of suitable size and shape mounted on grommets 25 and secured to a power unit frame plate 21 by screws 24 within insulating members 26. Secured to a rotatable shaft 30 of motor 20, is a suitable rotatable coupling 31 with pins 32 capable of transmitting rotation from said motor shaft to a driven part of the calculating machine when the power unit is installed therein as will hereinafter be more fully explained. Mounted on frame 21 is a terminal block 33 of insulating material with lead terminals 34 and 35 mounted therein. Electrically connected to lead terminals 34 and 35 are suitable lead connectors 40 and 41 respectively. Secured to the connector 40 is a lead 42 which is connected at its other end to a field coil of motor 20. (Note: Wires connecting parts of the power unit are indicated by dash-double-dot lines.) Another lead 43 connects one terminal of a normally open micro switch 44 to a terminal 56 of a dual condenser 52, and intermediate its ends it is secured to connector 41. A lead 51 connects the second terminal of micro switch 44 with a common terminal 53 of dual condenser 52, and intermediate its ends, lead 51 is connected to one terminal of a resistor 50. Also connected to the common terminal 53 of condenser 52 is a lead 55 which is connected at its other end to one terminal of a speed controlling device or governor 60. From the other terminal of governor 60, a lead 61 is connected to the other terminal of the motor 20. A lead 62 connects this common motor terminal with a second terminal 54 of the dual condenser 52, and intermediate its ends it is connected to the other terminal of resistor 50.

The foregoing description of the electrical power unit wiring is not to be construed as the only scheme of wiring for such a unit, but will serve to clarify the functions of the component parts and show that all the necessary wiring is contained within said unit. In other words, as will presently be explained, when the power unit is installed in the machine no electrical connections have to be made between the power unit and the machine.

Integral with frame 21 are a plurality of ears 22 provided with screw holes 23 to enable the frame 21 of the electrical power unit to be fastened to the base of the calculating machine.

Referring to Figure 3, 65 is the base or bottom wall of a calculating machine. A mechanism frame 63 secured to said base has a shaft 64 mounted therein. A rotatable coupling 70 (Fig. 4) with pins 71 is secured to shaft 64. When the unit is installed in the main frame structure 63, 65 of the machine, the coupling 70 is adapted to be connected to the coupling 31 by means of an intermediate member 72 of insulating material having holes 74 to receive pins 71 and holes 73 to receive pins 32.

The base 65 of the calculating machine is provided with an aperture 66 (Fig. 3), generally similar to the outline of the base 21 of the electrical power unit, exclusive of ears 22, through which said unit may be introduced for installation in the machine. As shown in phantom lines in Figure 6, the unit is introduced from the under side of the base wall 65 with the couplings 31 and 70 in axially separated relationship to dispose the couplings in substantially coaxial alignment. Then the power unit is moved axially of the couplings 31 and 70 from the dotted line position to the full line position (Figure 3) to effect operative connection of the coupling members to each other. The support 21 is adapted to lie within and constitute a closure for the aperture 66. In order to enable the power unit to be moved axially of the couplings 31 and 70 while within the aperture 66 to effect operative connecting of the couplings, the dimension of the base 21 parallel to the axis of the couplings is less than the corresponding dimension of the aperture 66 by an amount at least as great as the axial movement of the power unit required to effect connecting of the coupling members.

Orienting and attaching screws 75 passing through holes 23 in ears 22 on the power unit base 21 extend into holes in the main base 65, first for determining the position to which the power unit is to be moved to connect the coupling members 31 and 70 in substantially coaxial alignment, and secondly for securing the power unit detachably to the mechanism frame structure 63, 65.

When the electrical power unit is thus secured to the machine, the micro switch on said unit is disposed in operative relationship with control mechanism in the machine. When the electrical power unit is so positioned in the machine, the leaf 45 (Fig. 6) of micro switch 44 underlies an ear 81 on bellcrank 80 pivotally mounted on arm 83 at 82. Arm 83 with an ear 84, formed thereon, underlying bellcrank 80 is guided by pin 86 on machine frame 63. A spring 85 urges bellcrank 80 into engagement with ear 84 of arm 83. The other extremity of arm 83 is pivotally connected at 90 to arm 91 secured to a shaft 92 which is rotatably mounted on the machine frame 63. Arm 93, also secured to shaft 92, is pivotally connected at 94 to link 95 pivotally connected to a conventional clutch control element 100, by pin 96.

The elements shown in Figure 5 are generally similar to those described in the patent to Friden No. 2,366,345, and will therefore be only briefly described in this specification insofar as they control the operation of the above-described series of levers, links, etc. Plus and minus keys 101 and 102, respectively, and division key 113, control in the conventional manner the lateral displacement of slide 103, slidably mounted on the machine frame 63 at 104 and 105. Abutting the rear end (to the left in Fig. 5) of slide 103 is pin 96 which, as heretofore explained, interconnects clutch control element 100 with link 95. Thus it will be obvious to those skilled in the art that depression of any operation control key will cause pin 96 (Fig. 5) to be displaced rearwardly.

Viewing Figure 6, rearward displacement of pin 96 causes clutch element 100 to be rotated clockwise about its pivot 110, thereby effecting engagement of clutch 111 in an orthodox manner. Rearward displacement of pin 96 also moves link 95 rearwardly, thereby rotating arms 93 and shaft 92 in a clockwise direction. Clockwise rotation of arm 91 causes downward movement of arm 83 and lip 81 depresses leaf 45 closing the above-described electrical circuit and starting the motor.

In a calculating machine similar to that disclosed in the above-cited patents to Friden, in a division operation the driving means is not started by the depression of the division key, but by the return of said key to inoperative position. Thus a different set of conditions must govern starting the motor in division from those in other operations.

Depression of division key 113 (Fig. 5) causes its associated key stem 112 and cam surface 114 formed thereon to be displaced downwardly, moving follower 115 in contact therewith, and associated slide 120, laterally (to the left in Fig. 5), essentially as described in the above-mentioned patents to Friden. An ear 122 formed on key stem 112 abuts a pin 121 secured to pivotally mounted bellcrank 123 (Fig. 6), so that the above-mentioned downward displacement of key stem 112 also causes counterclockwise rotation of bellcrank 123 about its pivot 124 against the urgency of spring 132. At 125 bellcrank 123 is connected to link 130, guided by slot 134 and pin 133 secured to the machine frame. The arm 130 is capable of being displaced (to the right in Fig. 6) to dispose its rear end 131 under extension 81a of ear 81. The above-mentioned counterclockwise rotation of bellcrank 123 will cause link 130 to be displaced to the right (Fig. 6) and will project end 131 thereof under extension 81a of ear 81, thereby restraining bellcrank 80 from operating switch 44 when the division key is depressed.

Depression of division key 113 (Fig. 5) through cam 114 and follower 115 moves slide 120, which is slidably mounted on frame 63 by pins 135, to the rear, causing pin 140 to rotate crank 141 clockwise about its pivot 142 where it will be latched in the manner disclosed in the aforementioned patents. Crank 141 has pivotally connected thereto at 143 a link 144 which is connected at 145 to a bellcrank 150 pivoted at 151. Counterclockwise rotation of bellcrank 150 causes its end 152 to move pin 153 secured in slide 103 toward the rear of the machine, thereby moving pin 96 (Fig. 6) rearwardly, which movement causes engagement of the clutch. Rearward movement of pin 96 also causes downward movement of arm 83. By the action of spring 85, bellcrank 80 is urged counterclockwise about center 82 to follow ear 84 on arm 83 but is restrained from so doing by the end 131 of link 130 which is moved under extension 81a when the division key is depressed. Upon release of division key 113 (Fig. 5), said key is caused to return to inoperative position by the urgency of spring 154, allowing bellcrank 123 (Fig. 6) to rotate clockwise under the urgency of spring 132, withdrawing the end 131 of link 130 from under ear 81a of bellcrank 80 enabling said bellcrank to rotate counterclockwise under the urgency of spring 85 until restrained from further rotation by lip 84 of crank 83. The resuling counterclockwise rotation of bellcrank 80 causes its lip 81 to contact and depress leaf 45 of micro switch 44, thereby starting the motor.

From the foregoing it will be seen that depression of any operation control key of the calculating machine will cause the clutch to be engaged in a conventional manner, and will also urge bellcrank 80 to close the micro switch 44 of the power unit. In a division operation, however, the disabling means is operated to restrain the rotation of bellcrank 80, and resultant closing of micro switch 44, until division key 113 returns to its raised position, at which time bellcrank 80 is allowed to rotate under the urgency of spring 85, thereby depressing leaf 45 of micro switch 44 to close the motor circuit.

Thus it will be seen that I have provided an electrical power unit which can be readily installed in an removed from a calculating machine, which only requires sliding a coupling into engagement to establish a driving connection between the motor and the drive shaft of the machine and which entirely eliminates the necessity of removing electrical parts individually, disconnecting wiring or mechanically connecting the switch to the calculating machine controls. In addition the power unit when installed in the machine is electrically insulated therefrom by the coupling member 72 and the mounting members 26.

I claim:

1. The combination with a calculating machine or the like having a base and calculating mechanism mounted on said base, said base having an aperture therein, of an electrical power unit to supply said power for driving the mechanism comprising a plurality of electrical elements including a motor and a switch therefor mounted on a unitary support, and wiring for connecting said elements in circuit, said wiring being contained within said unit, said unit being adapted to be introduced through said aperture for installation in said machine and to be withdrawn through said aperture for removal from the machine, a coupling member on said motor, a coupling member connected to said mechanism, and orienting means for determining the relative positions of said base and said support when said unit is introduced through said aperture, said coupling members being so located relative to said base and said support respectively as to be placed in mutual driving engagement when the relative positions of said base and support are determined by said orienting means.

2. The combination with a calculating machine or the like having a frame including a wall, and mechanical drive mechanism including a coupling member mounted in said frame, of an electrical power unit to supply the power for driving said drive mechanism comprising a plurality of electrical elements mounted on a unitary support, said elements including a motor having a coupling member and a switch for said motor, and wiring for connecting said electrical elements in circuit, said wiring being contained within said unit, said frame wall having an aperture therein, said unit being adapted to be introduced through said aperture for installation in said machine, and orienting means on said frame and said support for determining the relative positions of said frame and said support when said unit is introduced through said aperture, said coupling members being so located relative to said frame and said support respectively as to be placed in mutual driving engagement when the relative positions of said frame and said support are determined by said orienting means.

3. The combination with a calculating machine or the like having a base, a frame secured thereto, and a mechanical drive mechanism mounted in said frame including a drive shaft having a coupling member, of an electrical power unit to supply the power for driving said drive mechanism comprising a plurality of electrical elements mounted on a unitary support, said elements including a motor having a coupling member, a switch for said motor, and wiring contained within said unit for connecting said elements in circuit, said machine base having an aperture therein, said unit being adapted to be introduced through said aperture for installation in said machine, and cooperating orienting means in said base and said support for determining the relative positions of said base and said support when said unit is introduced through said aperture, said coupling members being so located relative to said base and said support respectively as to be placed in mutual driving engagement when the relative positions of said base and said support are determined by said orienting means.

4. The combination with a calculating machine or the like having a frame including a wall, a mechanical drive means mounted in said frame, and means for controlling operation of said drive means including a motor switch operating means, of an electrical power unit to supply the power for driving said drive mechanism comprising a plurality of electrical elements mounted on a unitary support, said elements including a motor, a switch for said motor, and wiring contained within said unit for connecting said elements in circuit, said frame wall having an aperture therein, and said unit being adapted to be introduced through said aperture into said frame, and orienting means for determining the relative positions of said frame and said support when said unit is introduced through said aperture to enable said motor to be operatively connected to said drive means, said switch operating means and said switch being so located relative to said frame and to said support respectively as to be placed in mutually cooperative relation when the relative positions of said frame and said support are determined by said orienting means.

5. The combination with a calculating machine or the like having a base provided with an aperture, a frame secured to said base, a mechanical drive mechanism mounted in said frame including a drive shaft having a coupling member, and means for controlling operation of said drive mechanism including a motor switch operating means, of an electrical power unit to supply the power for driving said drive mechanism comprising a plurality of electrical elements mounted on a unitary support, said elements including a motor having a coupling member, a switch for said motor, and wiring contained within said unit for connecting said elements in circuit, said unit being adapted to be introduced through said aperture for installation in said machine, and orienting means for determining the relative positions of said base and said support when said unit is introduced through said aperture, said switch operating means and said switch being so located relative to said base and said support respectively as to be placed in mutually cooperative relation when the relative positions of said base and said support are determined by said orienting means, and said coupling members being so located relative to said base and said support respectively as to be placed in mutual driving engagement when the relative positions of said base and said support are determined by said orienting means.

6. The combination with a calculating machine or the like having a frame including a wall, a mechanical drive means mounted in said frame, and means for controlling operation of said drive means including a motor switch operating member movable from an inoperative position to an operative position, of an electrical power unit to supply the power for driving said drive mechanism comprising a plurality of electrical elements mounted on a unitary support, said elements including a motor, a switch having a member movable to cause closure of said switch, and wiring contained within said unit for connecting said elements in circuit, said frame wall having an aperture therein, said unit being adapted to be introduced through said aperture for installation in said machine, and orienting means for determining the relative positions of said frame and said support when said unit is introduced through said aperture to enable said motor to be connected to said drive means, said switch operating member and said movable member of said switch being so located relative to said frame and to said support respectively that said movable member of said switch is disposed in the path of movement of said switch operating member when the relative positions of said frame and said support are determined by said orienting means.

7. In a calculating or like machine, the combination of a main frame structure including a base provided with an aperture, and a mechanism frame mounted on top of said base; calculating or like mechanism mounted on said mechanism frame and including a drive shaft equipped with a first rotatable coupling member; an electrical power unit for operating said drive shaft and including a support, a motor equipped with a second rotatable coupling member, and wiring for said motor carried by said support, the equipment carried by said support being adapted to be introduced through said aperture to dispose said first and second coupling members in coupled relationship to provide the driving connection between said motor and said drive shaft; and cooperating means on said base and said support for detachably securing said unit to said main frame structure and for maintaining said coupling members in substantially coaxial alignment.

8. In a calculating or like machine, the combination of a main frame structure including a base provided with an aperture, and a mechanism frame mounted on top of said base; calculating or like mechanism mounted on said mechanism frame and including a drive shaft equipped with a first rotatable coupling member; an electrical power unit for operating said drive shaft and including a support, a motor equipped with a second rotatable coupling member, and wiring for said motor carried by said support, the equipment carried by said support being adapted to be introduced through said aperture to dispose said first and second coupling members in coupled relationship to provide the driving connection between said motor and said drive shaft; and cooperating means on said base and said support for detachably securing said unit to said main frame structure and for maintaining said coupling members in substantially coaxial alignment, said support comprising a plate and said securing means locating said support in position to substantially close said aperture when said power unit is in operative position and said coupling members are coupled.

9. In a calculating or like machine, the combination of a main frame structure including a base provided with an aperture, and a mechanism frame mounted on top of said base; calculating or like mechanism mounted on said mechanism frame and including a drive shaft equipped with a first rotatable coupling member; an electrical power unit for operating said drive shaft and including a support, a motor, wiring for said motor, and a second rotatable coupling member driven by said motor and being adapted to be operatively connected to said first rotatable coupling member by movement of said power unit relatively to said first coupling member axially of said second coupling member, the equipment carried by said support being adapted to be introduced through said aperture with said coupling members in axially separated relationship to dispose said coupling members in substantially coaxial alignment, and to then be moved axially of said coupling members to effect operative connection of said coupling members to each other; and cooperating aligning and securing means on said base and said support for determining and fixing the position of said power unit relative to said frame structure to effect and maintain substantial alignment of said coupling members in operatively connected relationship.

10. In a calculating or like machine, the combination of a main frame structure including a base provided with an aperture, and a mechanism frame mounted on top of said base; calculating or like mechanism mounted on said mechanism frame and including a drive shaft extending substantially parallel to and above the general plane of said aperture, and being equipped with a first rotatable coupling member; an electrical power unit for operating said drive shaft and including a support, a motor, wiring for said motor, and a second rotatable coupling member driven by said motor and being adapted to be operatively connected to said first rotatable coupling member by movement of said power unit relatively to said first coupling member axially of said second coupling member, the equipment carried by said support being adapted to be introduced through said aperture in a direction transverse to the axes of said coupling members with said coupling members in axially separated relationship to dispose said coupling members in substantially coaxial alignment, and to then be moved axially of said coupling members to effect operative connection of said coupling members to each other; and cooperating aligning and securing means on said base and said support for determining and fixing the position of said power unit relative to said frame structure to effect and maintain substantial alignment of said coupling members in operatively connected relationship, said support comprising a plate adapted to lie within said aperture when said power unit is attached to said frame structure, the dimension of said support parallel to the axis of said second coupling member being less than the corresponding dimension of said aperture by an amount at least as great as the movement of said unit axially of said coupling members required for effecting the operative connecting of said coupling members.

11. In a calculating or like machine, the combination of a main frame structure including a base provided with an aperture, and a mechanism frame mounted on top of said base; calculating or like mechanism mounted on said mechanism frame and including a drive shaft equipped with a first rotatable coupling member and a motor switch operating means; an electrical power unit for operating said drive shaft and including a support, a motor equipped with a second rotatable coupling member, a switch for said motor, and wiring for said motor and switch carried by said support, the equipment carried by said support being adapted to be introduced through said aperture to dispose said switch in operative relationship to said switch operating means and to dispose said first and second coupling members in coupled relationship to provide the driving connection between said motor and said drive shaft; and cooperating means on said base and said support for detachably securing said unit to said main frame structure and for maintaining said coupling members in substantially coaxial alignment.

JOHN L. MOODY.

REFERENCES CITED

The following references are of record in the file of this patent:

UNITED STATES PATENTS

| Number | Name | Date |
|---|---|---|
| 1,080,548 | Gardner | Dec. 9, 1913 |
| 1,549,101 | Wales | Aug. 11, 1925 |
| 1,853,050 | Horton | Apr. 12, 1932 |
| 1,925,735 | Sundstrand | Sept. 5, 1933 |
| 2,243,798 | Gang | May 27, 1941 |
| 2,251,100 | Anderson | July 29, 1941 |